(12) United States Patent
Lee et al.

(10) Patent No.: US 7,893,117 B2
(45) Date of Patent: Feb. 22, 2011

(54) ION-CONDUCTING CROSSLINKED COPOLYMER AND FUEL CELL COMPRISING THE SAME

(75) Inventors: Jae-jun Lee, Suwon-si (KR); Jin-gyu Lee, Seoul (KR); Sang-kook Mah, Seoul (KR); Myung-sup Jung, Seongnam-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1169 days.

(21) Appl. No.: 11/546,779

(22) Filed: Oct. 11, 2006

(65) Prior Publication Data

US 2007/0082247 A1     Apr. 12, 2007

(30) Foreign Application Priority Data

Oct. 12, 2005     (KR) .................... 10-2005-0096192

(51) Int. Cl.
   - *C08J 5/20*     (2006.01)
   - *C08G 75/00*    (2006.01)
   - *C08L 81/00*    (2006.01)
   - *H01M 8/10*     (2006.01)

(52) U.S. Cl. .................... 521/25; 521/27; 525/535; 525/330.9; 528/171; 528/391; 429/33

(58) Field of Classification Search ............... 525/535, 525/330.9; 528/391, 171; 521/25, 27; 429/33
   See application file for complete search history.

(56) References Cited

U.S. PATENT DOCUMENTS

2002/0091225 A1     7/2002   McGrath et al.

(Continued)

FOREIGN PATENT DOCUMENTS

CN          1687183 A     10/2005

(Continued)

OTHER PUBLICATIONS

Japan Office action dated October 20, 2009 in corresponding Japanese patent Application No. 2006-279095, listing the cited references in this IDS.

(Continued)

*Primary Examiner*—Duc Truong
(74) *Attorney, Agent, or Firm*—Christie, Parker & Hale, LLP

(57)     ABSTRACT

An ion-conducting, sulfonated and crosslinked copolymer for use in a fuel cell is disclosed. The ion-conducting, sulfonated and crosslinked copolymer is made up of four monomers. The first monomer is an aromatic diol. The second monomer includes two groups, each group capable of reacting with the hydroxy groups of the first monomer, and each group independently selected from a nitro group and a halogen group. The third monomer is one of the first monomer or the second monomer, except that one of the hydrogen atoms attached to a benzene ring is substituted with —$SO_3Y$, where Y is selected from hydrogen (H), lithium (Li), sodium (Na), potassium (K) and trialkyl ammonium of the form $HNR_3$ where R is an alkyl group having from 1 to 5 carbon atoms. The fourth monomer includes at least three groups, each independently selected from a hydroxy group, a nitro group, and a halogen group.

20 Claims, 2 Drawing Sheets

U.S. PATENT DOCUMENTS

2006/0134494 A1    6/2006    Shin et al.
2006/0155097 A1    7/2006    Weber et al.

FOREIGN PATENT DOCUMENTS

| | | |
|---|---|---|
| EP | 1 420 473 A1 | 5/2004 |
| JP | 2003-217343 | 7/2003 |
| JP | 2003-286339 | 10/2003 |
| JP | 2004-047244 | 2/2004 |
| JP | 2005-179542 | 7/2005 |
| JP | 2005-235404 | 9/2005 |
| JP | 2005-264008 | 9/2005 |
| JP | 2006-128066 | 5/2006 |
| JP | 2006-206779 | 8/2006 |

OTHER PUBLICATIONS

SIPO Certificate of Patent dated Jun. 16, 2010, for corresponding Chinese Patent application 200610063916.7, noting listed references in this IDS.

Japanese Office action dated May 25, 2010, for corresponding Japanese Patent application 2006-279095.

English translation of Japanese Office action dated May 25, 2010, for corresponding Japanese Patent application 2006-279095.

ION-CONDUCTING CROSSLINKED COPOLYMER AND FUEL CELL COMPRISING THE SAME

CROSS-REFERENCE TO RELATED PATENT APPLICATION

This application claims priority to and the benefit of Korean Patent Application No. 10-2005-0096192, filed on Oct. 12, 2005 in the Korean Intellectual Property Office, the entire disclosure of which is incorporated herein by reference.

BACKGROUND OF THE INVENTION

1. Field of the Invention

The present invention relates to an ion-conducting, sulfonated and crosslinked copolymer for use as a polymer electrolyte membrane for a fuel cell and a fuel cell comprising the same. More particularly, the polymer electrolyte membrane comprises an ion-conducting, sulfonated and crosslinked copolymer which may reduce swelling, may reduce methanol crossover, may provide excellent dimension stability, and may be capable of maintaining high ionic conductivity.

2. Description of the Related Art

Fuel cells are electrochemical devices which directly convert the chemical energy of oxygen and hydrogen from hydrocarbon substances such as methanol, ethanol, or natural gas into electrical energy. Since the energy conversion processes of fuel cells are very efficient and environmentally friendly, fuel cells have attracted attention.

Fuel cells may be classified into phosphoric acid fuel cells (PAFCs), molten carbonate fuel cells (MCFCs), solid oxide fuel cells (SOFCs), polymer electrolyte membrane fuel cells (PEMFCs), alkaline fuel cells (AFCs), and other types according to the type of electrolyte used. Although these fuel cells operate on the same basic principles, they differ from one another, for example, in terms of the type of fuel used, the operating temperature, the catalyst used, and the electrolyte used. PEMFCs are popular not only for small stationary electricity generating apparatuses, but also for transportation systems due to their low operating temperature, high power density, short start-up time, and quick response to changes in power requirements.

A key portion of a PEMFC is a membrane electrode assembly (MEA). The MEA generally consists of a polymer electrolyte membrane and two electrodes attached to both sides of the polymer electrolyte membrane, the electrodes functioning as a cathode and an anode, respectively.

The polymer electrolyte membrane functions as a separator layer which prevents the direct contact of an oxidizing agent with a reducing agent and functions to electrically isolate the two electrodes. Further, the polymer electrolyte membrane functions as a proton conductor. Thus, an excellent polymer electrolyte membrane must generally provide: (1) high proton conductivity, (2) high electrical insulation, (3) low permeation of reactants, (4) excellent thermal, chemical, and mechanical stability under fuel cell operating conditions, and (5) low costs.

To satisfy the above requirements, various polymer electrolyte membranes have been developed. Currently, highly fluorinated polysulfonic acid membranes, made from a material such as NAFION™ (Dupont), are often used due to their excellent durability and performance. However, a NAFION™ membrane should be sufficiently humidified to operate well, and should be used at 80° C. or less to prevent loss of water.

In DMFCs, an aqueous solution of methanol is provided as a fuel to an anode. A portion of an unreacted methanol solution penetrates the polymer electrolyte membrane and induces swelling of the polymer electrolyte membrane, while diffusing and being transported into a catalytic layer of a cathode. Such a swelling phenomenon is referred to as 'methanol crossover'. When methanol crossover occurs, methanol is directly oxidized at the cathode where an electrochemical reduction of hydrogen ions and oxygen normally occurs. Thus, an electrical potential of the cathode drops, and as a result, the performance of the fuel cell may be seriously deteriorated. This problem similarly occurs in other fuel cells that also use an organic liquid fuel with polar qualities.

SUMMARY OF THE INVENTION

According to an embodiment of the present invention, a polymer is provided which can remarkably reduce methanol crossover and improve the dimension stability of a polymer electrolyte membrane without reducing ionic conductivity.

According to an embodiment of the present invention, a polymer electrolyte membrane is provided having remarkably reduced methanol crossover and improved dimension stability without reducing ionic conductivity.

According to another embodiment of the present invention, a membrane electrode assembly is provided comprising the above polymer material.

According to still another embodiment of the present invention, a fuel cell is provided comprising the above polymer material.

According to an embodiment of the present invention, an ion-conducting, sulfonated and crosslinked copolymer is provided which includes four monomers. The first monomer is an aromatic diol. The second monomer comprises two groups, each group capable of reacting with the hydroxy groups of the first monomer, and each group independently selected from a nitro group and a halogen group. The third monomer comprises one of the first monomer or the second monomer, except that one of the hydrogen atoms attached to a benzene ring is substituted with —$SO_3Y$, where Y is selected from hydrogen (H), lithium (Li), sodium (Na), potassium (K) and trialkyl ammonium of the form $HNR_3$ where R is an alkyl group having from 1 to 5 carbon atoms. The fourth monomer comprises at least three groups, each independently selected from a hydroxy group, a nitro group, and a halogen group.

According to another embodiment of the present invention, a polymer electrolyte membrane is provided including an ion-conducting, sulfonated and crosslinked copolymer as described above.

According to still another embodiment of the present invention, a membrane electrode assembly is provided which includes: a polymer electrolyte membrane comprising an ion-conducting, sulfonated and crosslinked copolymer as described above; a cathode provided on one side of the polymer electrolyte membrane and comprising a catalytic layer and a diffusion layer; and an anode provided on the other side of the polymer electrolyte membrane and comprising a catalytic layer and a diffusion layer.

According to yet another embodiment of the present invention, a fuel cell is provided which includes at least one membrane electrode assembly as described above.

By using ion-conducting, sulfonated and crosslinked copolymers according to the invention, a polymer electrolyte membrane having excellent dimension stability and remarkably reduced methanol crossover without reducing ionic conductivity may be provided.

The above and other features and advantages of the present invention will become more apparent by describing in detail exemplary embodiments thereof.

DETAILED DESCRIPTION OF THE INVENTION

Figure 1:
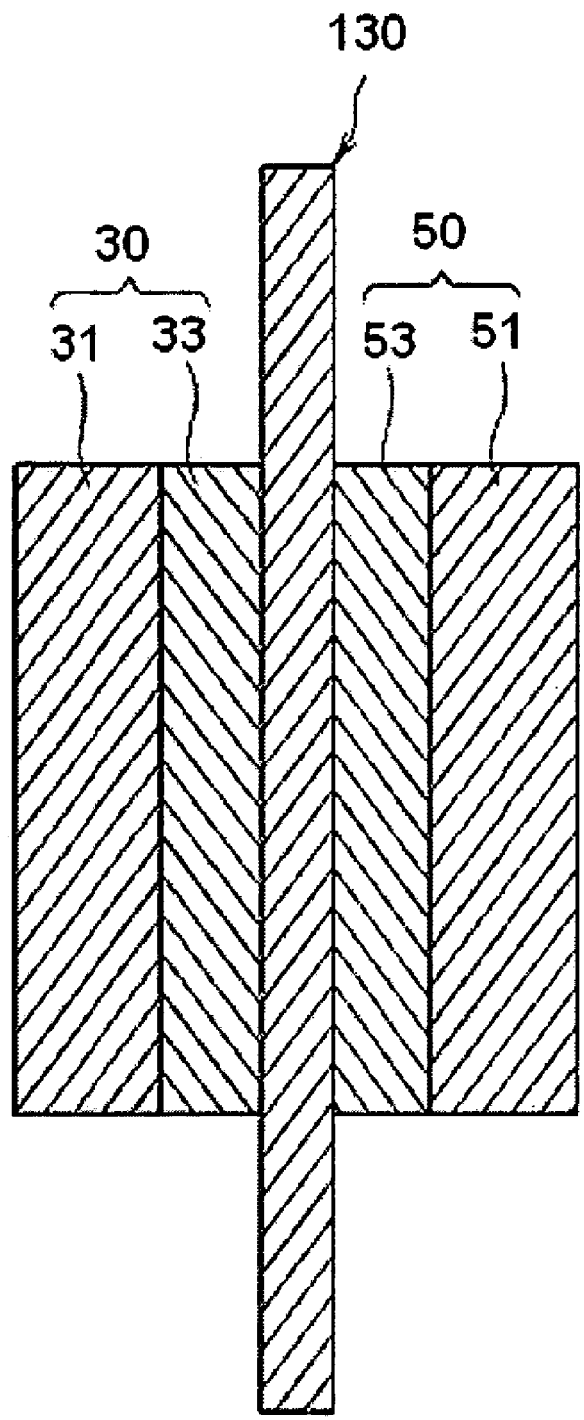
FIG. 1 is a schematic illustration of a Membrane Electrode Assembly (MEA) according to an embodiment of the invention.

The present invention will now be described in detail by explaining embodiments of the invention.

An ion-conducting, sulfonated and crosslinked copolymer according to an embodiment of the present invention comprises four monomers. The first monomer is an aromatic diol. The second monomer comprises two groups, each group being capable of reacting with the hydroxy groups of the first monomer and each group independently selected from a nitro group and a halogen group. The third monomer comprises one of the first monomer or the second monomer, except that one of the hydrogen atoms attached to a benzene ring is substituted with —$SO_3Y$, where Y is hydrogen (H), lithium (Li), sodium (Na), potassium (K) or trialkyl ammonium of the form $HNR_3$ where R is an alkyl group having from 1 to 5 carbon atoms. The fourth monomer comprises at least three groups, each independently selected from a hydroxy group, a nitro group, and a halogen group.

In the copolymerization of the first to the fourth monomers, the hydroxy group reacts with the halogen group or the nitro group. In an embodiment of the invention, the mole ratio of the hydroxy groups to the total of the nitro groups and the halogen groups is from 4.0:6.0 to 6.0:4.0, and preferably is from 4.8:5.2 to 5.2:4.8, and more preferably is about 5.0:5.0.

If the mole ratio of the hydroxy groups to the total of the nitro groups and the halogen groups deviates from the above ranges, unreacted monomers tend to remain, and low molecular weight polymers are formed. This tends to have an adverse effect on the physical properties of the copolymers.

The mole fraction of the fourth monomer is related to the degree of crosslinking of the synthesized copolymer. In an embodiment, the mole fraction of the fourth monomer to the total of the first through fourth monomers having the same reactive functional groups as the fourth monomer is from 0.001 to 0.5, and is preferably from 0.03 to 0.25, and more preferably from 0.05 to 0.15. If the mole fraction of the fourth monomer is less than 0.001, the physical properties of the copolymer are almost the same as the physical properties for a copolymer which is not crosslinked, and thus, desired properties of preventing swelling and reducing methanol crossover are not adequately achieved. If the mole fraction of the fourth monomer is greater than 0.5, the solubility of the copolymer in a solvent decreases making it is difficult to prepare the copolymer, and the resultant polymeric film tends to become brittle.

In an embodiment, the mole fraction of the third monomer to the total of the first through fourth monomers is from 0.01 to 0.95, and preferably is from 0.05 to 0.85, and more preferably is from 0.1 to 0.45. If the mole fraction of the third monomer is less than 0.01, the ionic conductivity of the hydrogen ion in the conducting membrane tends to deteriorate and the membrane resistance may greatly increase. If the mole fraction of the third monomer is greater than 0.95, the swelling and permeation by a fuel, such as methanol and water tend to increase and the efficiency of the membrane may decrease.

The mole fractions of the first monomer and the second monomer depend on the mole fractions of the third monomer and the fourth monomer and the ratio of the hydroxy groups to the halogen groups and the nitro groups.

An ion-conducting, sulfonated and crosslinked copolymer may also be prepared by polymerizing only the first, second, and fourth monomers, and providing an ion conducting functional group to the copolymer using, for example, sulfuric acid. However, it may be difficult to control the concentration of the ion conducting functional group to be substituted, and the production of such a copolymer may be more complicated. Thus, because it is easier to control the physical properties of the copolymer, and it is easier to produce the copolymer, it is generally advantageous to also include the third monomer which already contains a sulfonic acid or a salt of a sulfonic acid.

However, when the copolymer is prepared using a third monomer containing a salt of a sulfonic acid as described above, a monovalent cation should be substituted with a hydrogen ion in order to provide ionic conductivity. For example, the substitution with the hydrogen ion may be performed using an acid such as diluted hydrochloric acid or diluted sulfuric acid.

In an embodiment, the first monomer may be any aromatic diol having two hydroxy groups. Examples include compounds selected from the compounds represented by Formulae 1(a) through 1(w), but the invention is not so limited. In particular, the first monomer may be an aromatic diol having from 6 to 20 carbon atoms.

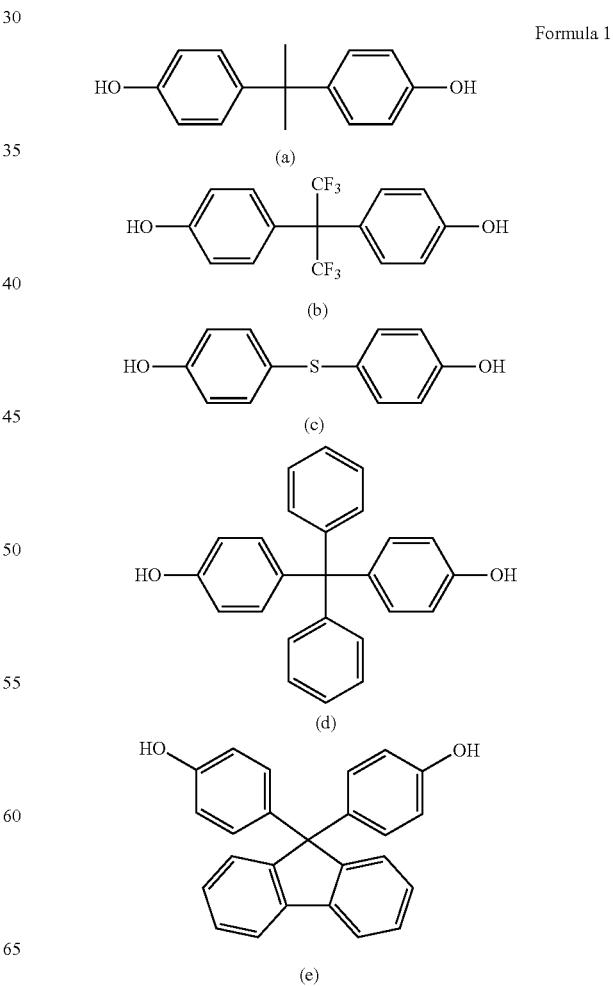

Formula 1

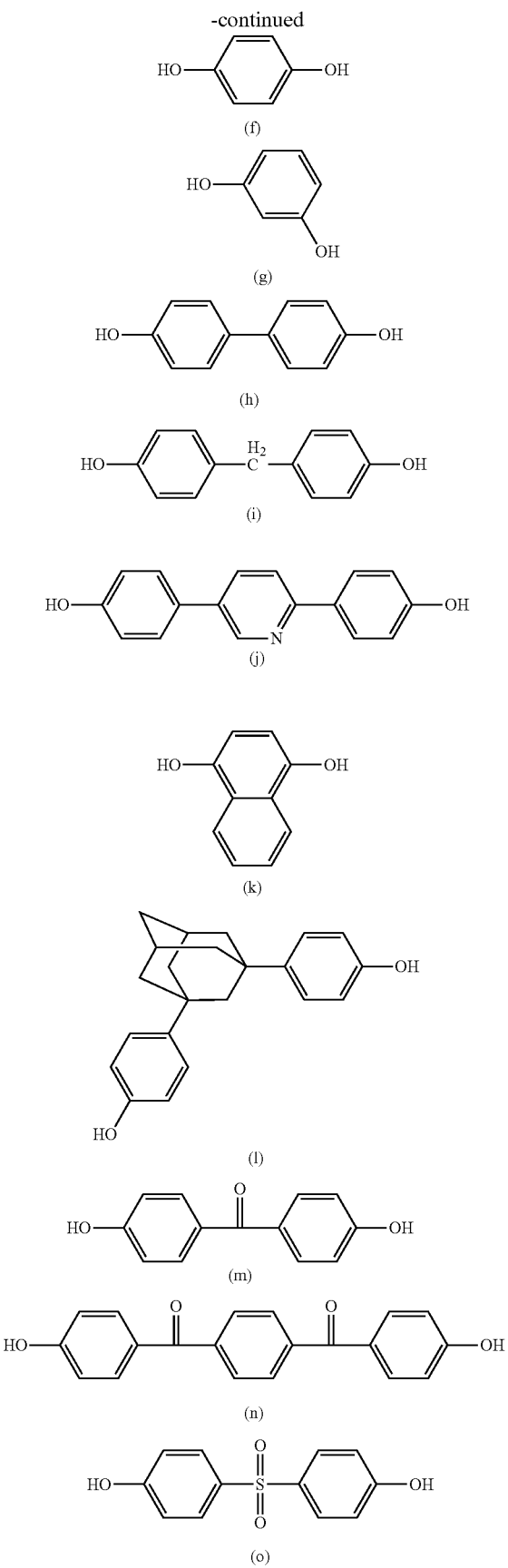
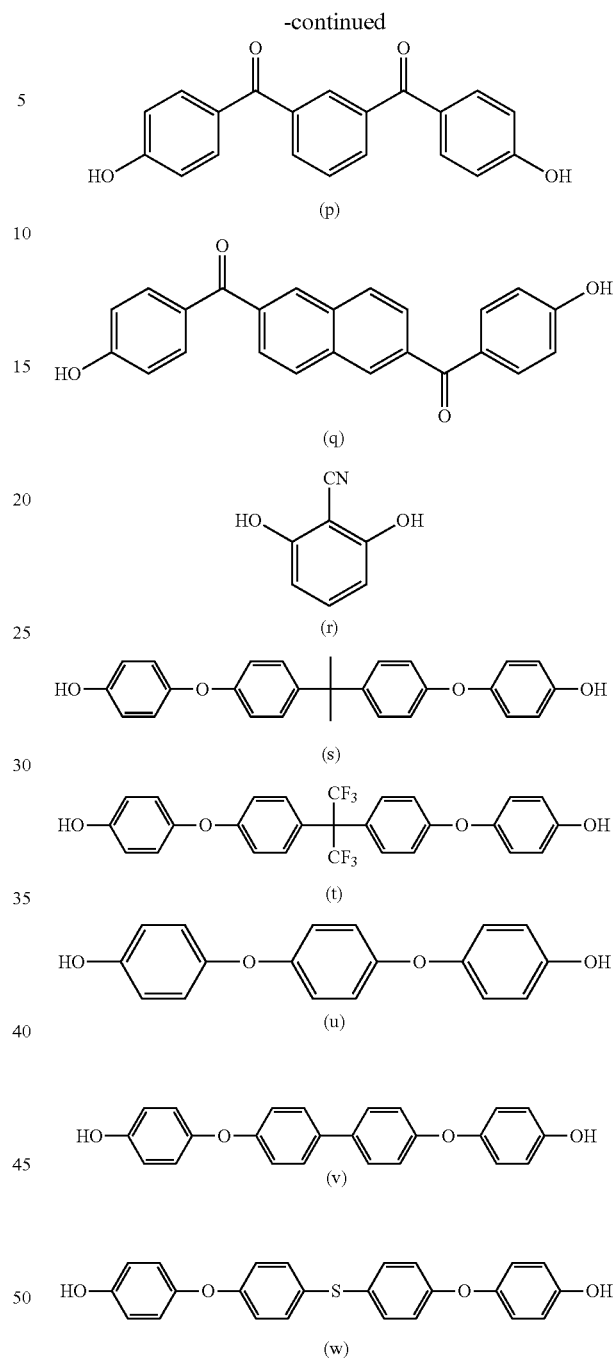

In an embodiment, the second monomer may be any compound comprising two groups, each group capable of reacting with hydroxy groups of the first monomer and each group independently selected from a nitro group and a halogen group. Examples of the second monomer include compounds selected from the compounds represented by Formulae 2(a) through 2(w), but the invention is not so limited. Further examples of the second monomer include aromatic or aliphatic compounds having from 3 to 20 carbon atoms and comprising two groups capable of reacting with the hydroxy groups of the first monomer, and each group independently selected from a nitro group and a halogen group.

Formula 2
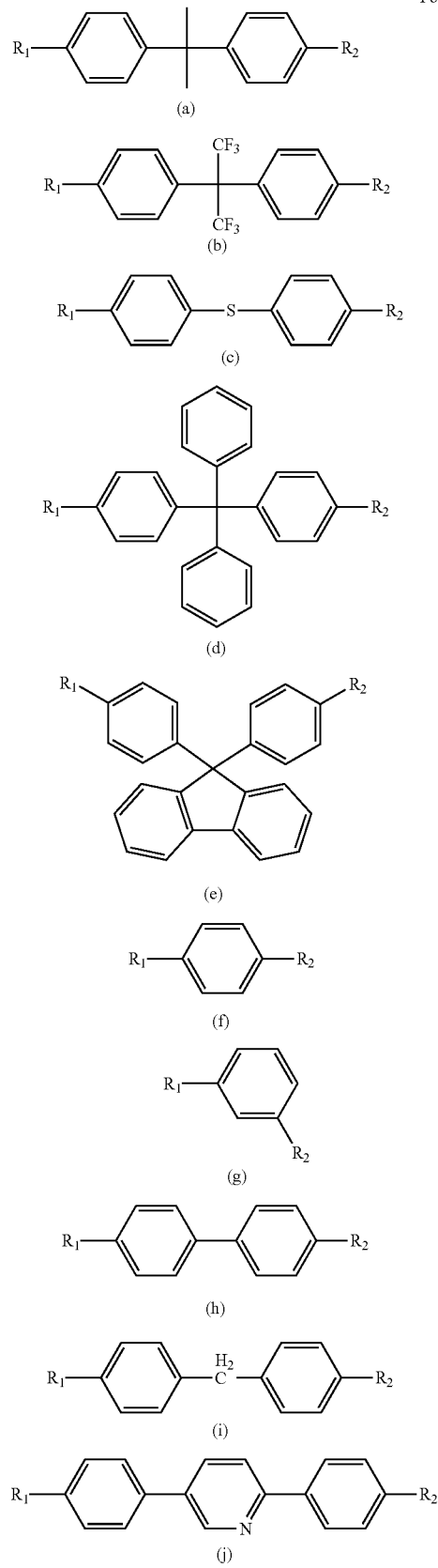
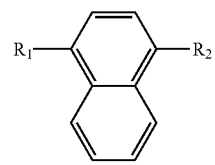
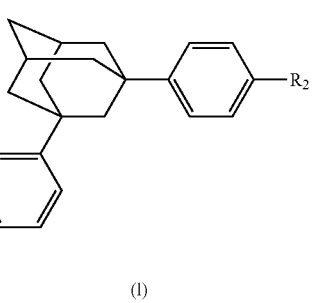
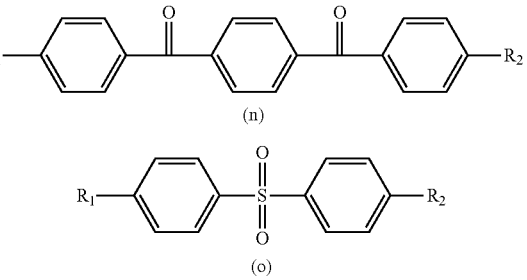
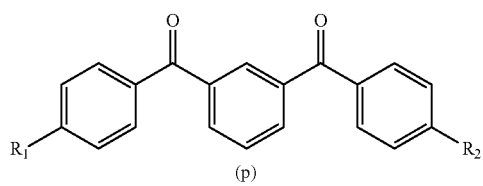
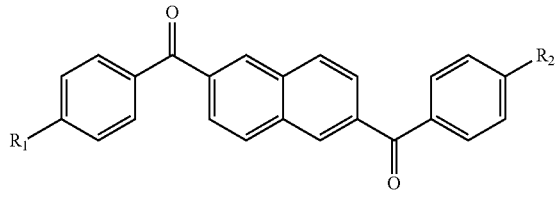
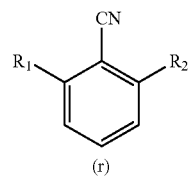
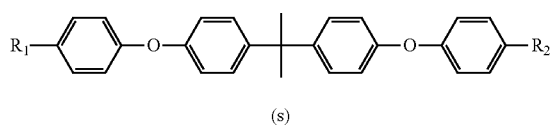

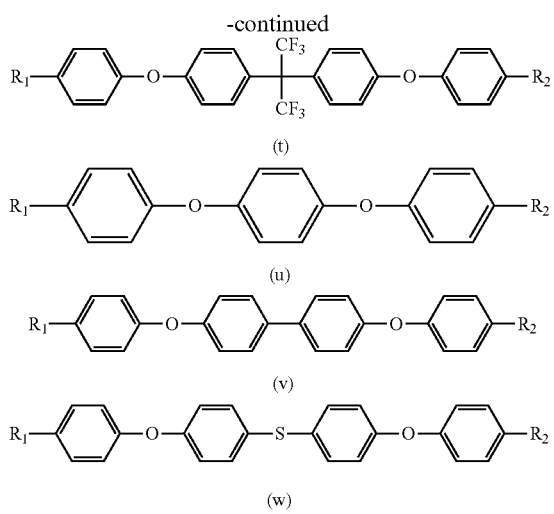

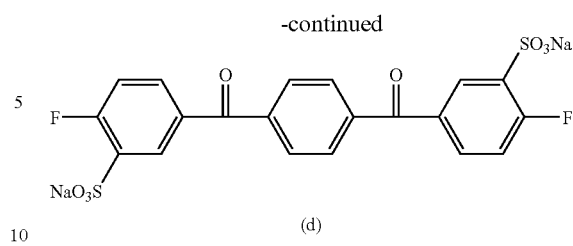

where each of R₁ and R₂ is independently selected from the group consisting of a nitro group and a halogen group, and because each is independently selected, each may be identical to or different from the other.

In an embodiment, the third monomer is selected from the first monomer and the second monomer, except that at least one of the hydrogen atoms attached to a benzene ring is substituted with —SO₃Y, where Y is a monovalent cation, and in a particular embodiment, Y is selected from hydrogen (H), lithium (Li), sodium (Na), potassium (K) and trialkyl ammonium of the form HNR₃ where R is an alkyl group having from 1 to 5 carbon atoms. In the third monomer, a single hydrogen atom or a plurality of hydrogen atoms may be substituted with —SO₃Y. The third monomer may be, for example, at least one compound selected from the compounds represented by Formulae 1(a) through 1(w) and the compounds represented by Formulae 2(a) through 2(w) where at least one hydrogen atom attached to a benzene ring is substituted with —SO₃Y, but the third monomer is not so limited.

Examples of the third monomer include one or more compounds selected from the compounds represented by Formulae 3(a) through 3(d), but the third monomer is not so limited.

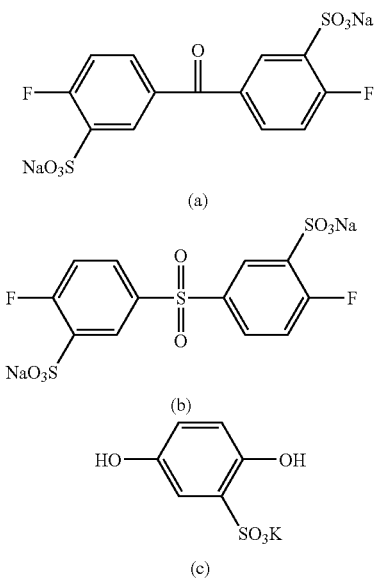

In an embodiment, the fourth monomer may be any compound comprising at least three groups, each group independently selected from a hydroxy group, a nitro group, and a halogen group. Examples of the fourth monomer include at least one compound selected from the compounds represented by Formulae 4(a) through 4(g), but the fourth monomer is not so limited. Particular examples of the fourth monomer include aromatic or aliphatic compounds having from 6 to 30 carbon atoms and comprising at least three groups independently selected from a hydroxy group, a nitro group, and a halogen group.

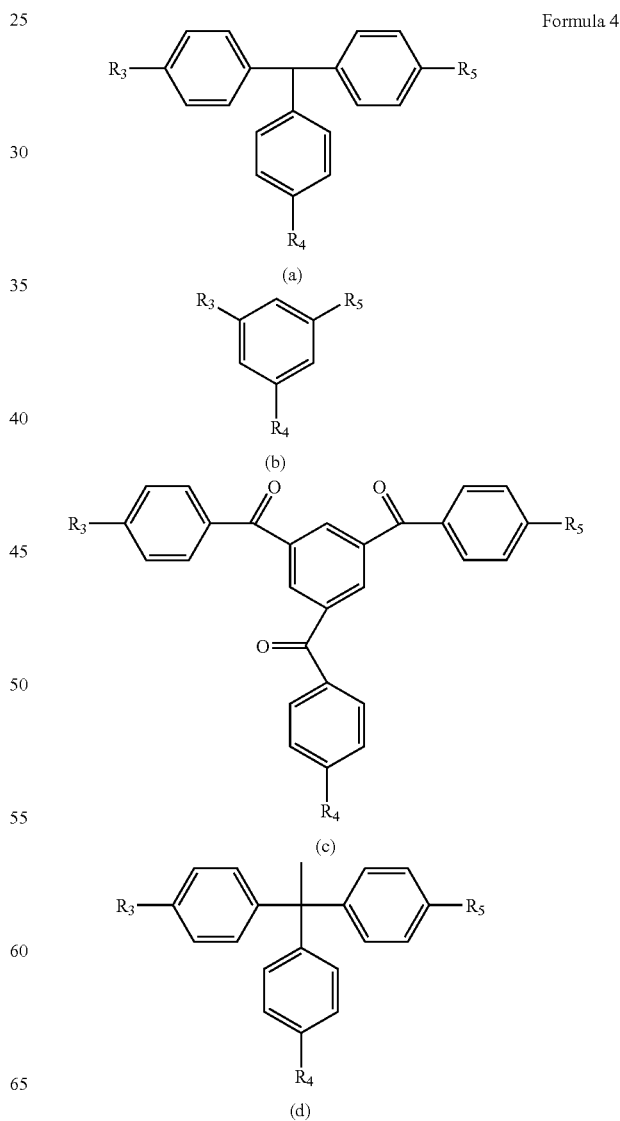

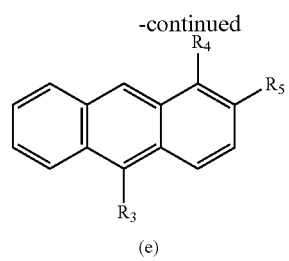

(e)

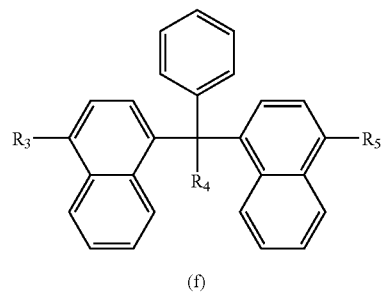

(f)

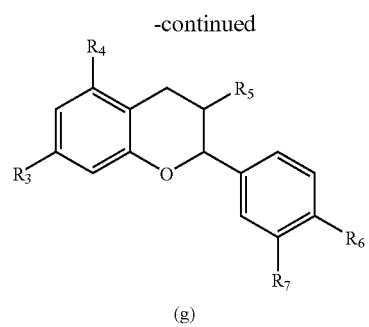

(g)

where each of $R_3$ through $R_7$ is independently selected from the group consisting of a hydroxy group, a nitro group and a halogen group, and because each is independently selected, they may be identical to or different from one another.

A method of preparing the ion-conducting, sulfonated and crosslinked copolymer according to an embodiment of the present invention will now be described in detail.

The ion-conducting, sulfonated and crosslinked copolymer according to an embodiment of the present invention may be prepared as in Scheme 1, but the method is not so limited.

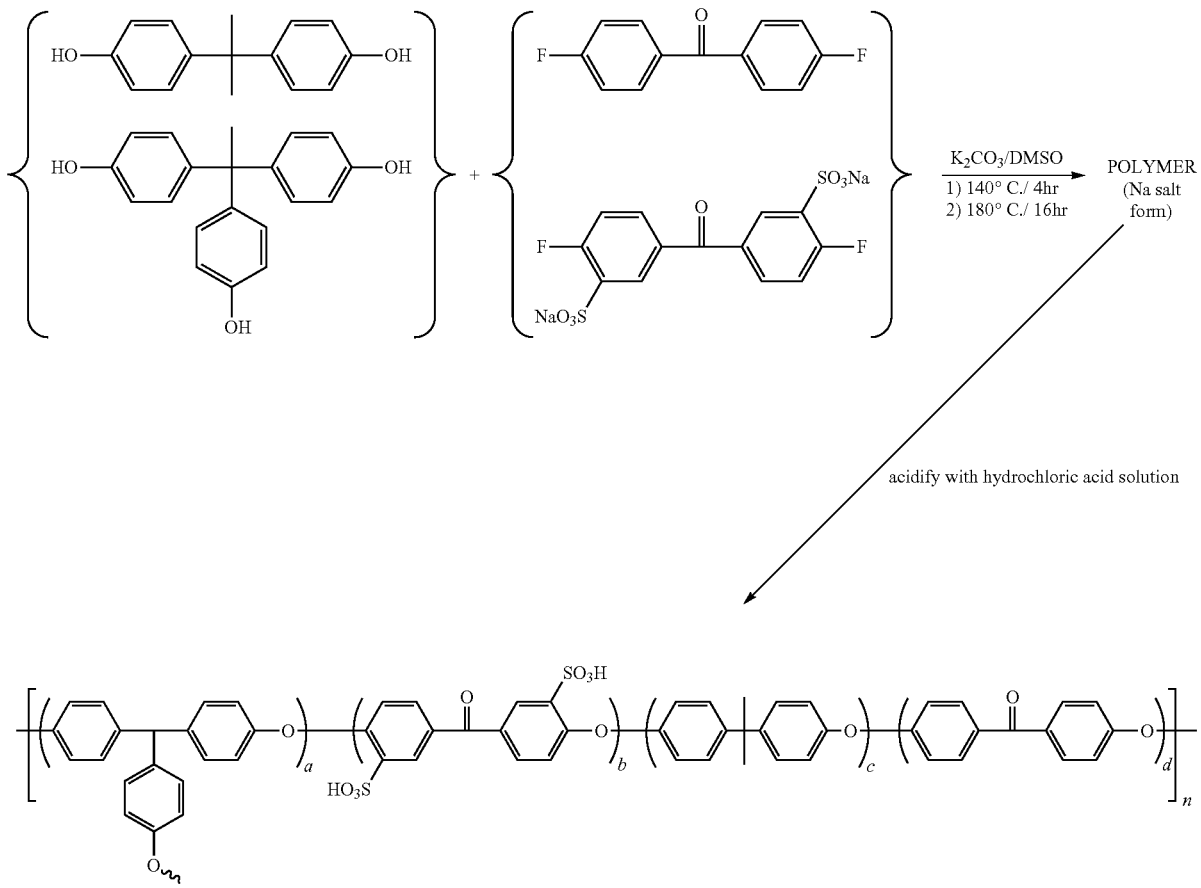

As illustrated in Scheme 1, the first monomer, the second monomer, the third monomer and the fourth monomer are mixed in a suitable mixing ratio and dissolved in a solvent, and then polymerized, preferably in the presence of a catalyst to obtain a polymer in the form of a sodium salt. The resulting polymer may then be acidified using, for example, an acidic solution such as hydrochloric acid, to prepare the ion-conducting, sulfonated and crosslinked copolymer according to an embodiment of the present invention.

The polymerization may be performed at 140-220° C. for 1-36 hours in the presence of a base material, for example, a metallic base salt, such as $K_2CO_3$. Suitable solvents for the polymerization include polar solvents, such as dimethylsulfoxide (DMSO), tetramethylene sulfone, 1-methyl-2-pyrrolidinone (NMP), N,N-dimethylformamide (DMF) or N,N-dimethylacetamide (DMAc). Prior to polymerization, an azeotropic dehydration agent, such as benzene, toluene, or xylene may be mixed with the reactants and reacted at 120-160° C. for 2-6 hours to convert the phenol monomers into phenoxide salts.

Nonlimiting examples of polymer electrolyte membranes comprising ion-conducting, sulfonated and crosslinked copolymers as described above will now be described in detail.

According to an embodiment of the present invention, the polymer electrolyte membrane may consist of only an ion-conducting, sulfonated and crosslinked copolymer described above.

In another embodiment of the present invention, the polymer electrolyte membrane may comprise an ion-conducting, sulfonated and crosslinked copolymer according to an embodiment of the present invention combined with other polymers, the combined polymers being interpenetrated with each other. Other polymers with which the ion-conducting, sulfonated and crosslinked copolymer may form the interpenetration (IPN) structure may be selected depending on the physical properties of the ion-conducting, sulfonated and crosslinked copolymer to be supplemented. For example, when it is necessary to further improve the ionic conductivity of the polymer electrolyte membrane, a polymer having excellent ionic conductivity may be used.

In another exemplary embodiment of the present invention, the polymer electrolyte membrane may be impregnated with an ion-conducting material, such as phosphoric acid. The impregnation may be performed using any method well known in the art, for example, immersion in a solution of phosphoric acid.

In another exemplary embodiment of the present invention, the polymer electrolyte membrane comprising the ion-conducting, sulfonated and crosslinked copolymer according to an embodiment of the present invention and other polymer electrolyte membranes may be laminated to form a multi-layered structure. Other polymer electrolyte membranes which are laminated on the polymer electrolyte membrane according to the present embodiment may be suitably selected from any materials known in the art for use in a polymer electrolyte membrane, depending on the physical properties to be supplemented.

A membrane electrode assembly comprising an ion-conducting, sulfonated and crosslinked copolymer will now be described in detail.

Referring to FIG. 1, a membrane electrode assembly according to an embodiment of the present invention is illustrated. The membrane electrode assembly comprises: a polymer electrolyte membrane 130 which includes an ion-conducting, sulfonated and crosslinked copolymer as described above; a cathode 30 on one side of the polymer electrolyte membrane 130 comprising a catalytic layer 33 and a diffusion layer 31; an anode 50 on the other side of the polymer electrolyte membrane 130 comprising a catalytic layer 53 and a diffusion layer 51. The cathode and the anode, each comprising a catalytic layer and a diffusion layer, may be any electrodes well known in the field of fuel cells.

Figure 2:
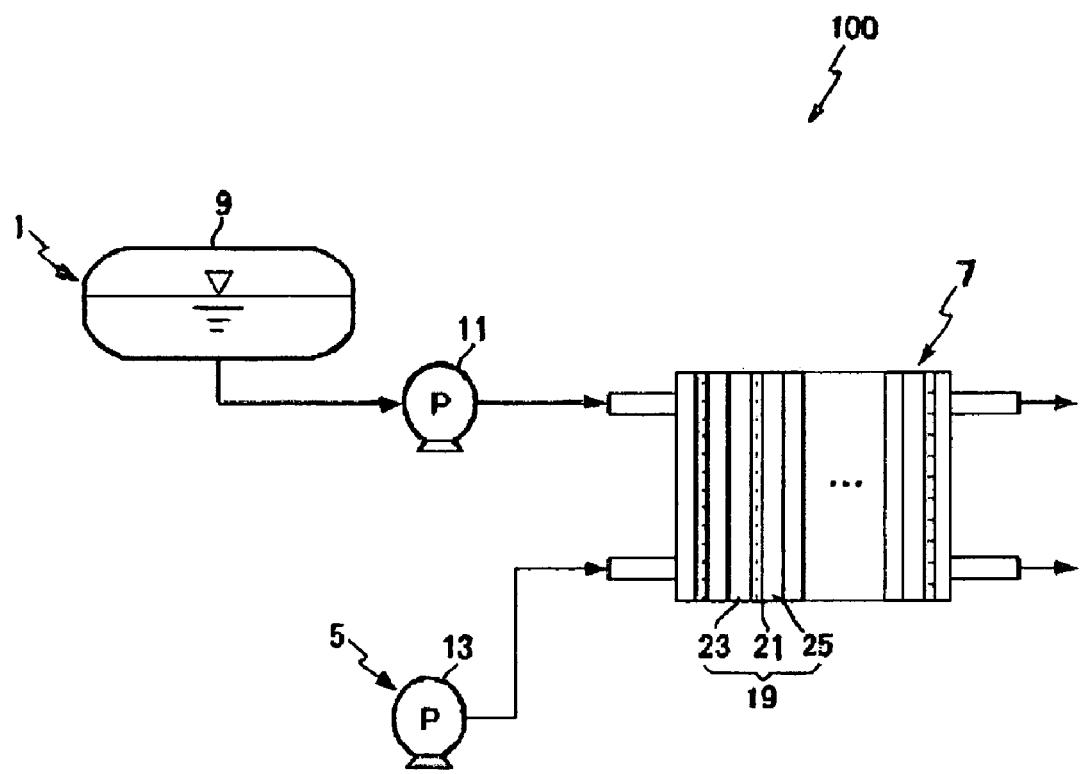
FIG. 2 is a schematic illustration of a fuel cell system according to an embodiment of the invention.

Referring to FIG. 2, a fuel cell system comprising a membrane electrode assembly including an ion-conducting, sulfonated and crosslinked copolymer as described above will now be described. The fuel cell system 100 comprises a plurality of electricity generating units 19, each comprising membrane electrode assembly 21 separated by separators 23 and 25, and arranged in a stack configuration to form a fuel cell stack 7. A fuel supplier 1 includes a fuel tank 9 for containing a fuel such as methanol and a fuel pump 11 for supplying the fuel to the stack 7. An oxygen supplier 5 includes an oxygen pump 13 for supplying oxygen from air to the stack 7.

The fuel cell system may be designed according to any conventional method disclosed in various references and thus, a detailed explanation of the fuel cell system is not provided herein.

The present invention will now be described in more detail with reference to the following examples. However, these examples are provided for illustration purposes only and are not intended to limit the scope of the invention.

Example 1

4.337 g (19.00 mmol) of a compound represented by Formula 5, 2.980 g (13.66 mmol) of a compound represented by Formula 6, 2.884 g (6.83 mmol) of a compound represented by Formula 7, 0.292 g (1.00 mmol) of a compound represented by Formula 8, and 2.832 g of anhydrous $K_2CO_3$ were charged into a 250 ml three-necked flask equipped with Dean-Stark trap, and solvents including 50 ml of dimethyl sulfoxide (DMSO) and 20 ml of toluene were mixed with them.

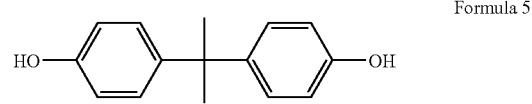

Formula 5

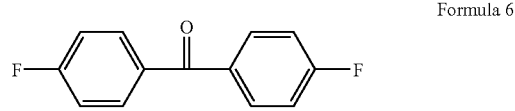

Formula 6

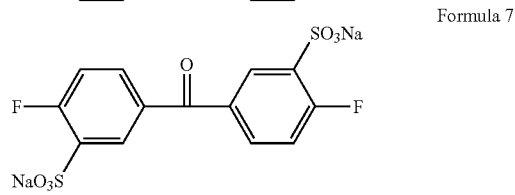

Formula 7

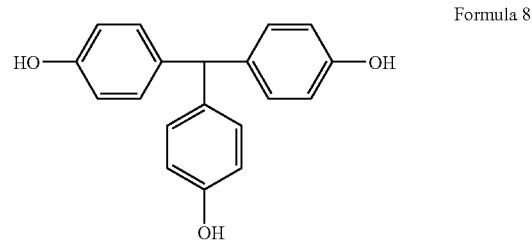

Formula 8

The mixture was refluxed at 140° C. for 4 hours under a nitrogen atmosphere to remove water, and then toluene was removed from the mixture. After increasing the reaction temperature to 180° C., the reactants were polymerized at a constant temperature for 16 hours. The resultant product was then cooled to room temperature and the reaction solution was precipitated into methanol. The precipitated copolymer was washed with hot distilled water three times to remove inorganic materials from the product. The resultant copolymer was then dried at 100° C. for 24 hours.

The above copolymer in the form of a sodium salt was dissolved in DMSO, dilute hydrochloric acid was added to the solution, and the solution was reacted for 24 hours. The solution was precipitated in a mixture of methanol and water to prepare a conducting copolymer substituted with a hydrogen ion ($T_g$: 165.9° C., $T_d$: 191.5° C.).

The ion-conducting, sulfonated and crosslinked copolymer prepared above was completely dissolved in DMSO and cast. Then the cast product was dried in an oven at 80° C. for 24 hours to obtain a polymer electrolyte membrane (membrane thickness: 132 µm). The dried membrane was immersed in distilled water for 24 hours.

Example 2

A conducting copolymer was prepared in the same manner as in Example 1, except that 4.378 g (19.18 mmol) of a compound represented by Formula 5, 3.098 g (14.20 mmol) of a compound represented by Formula 6, 2.998 g (7.10 mmol) of a compound represented by Formula 7, 0.622 g (2.13 mmol) of a compound represented by Formula 8, 2.95 g of anhydrous $K_2CO_3$, 55 ml of DMSO, and 30 ml of toluene were used ($T_g$: 173.5° C., $T_d$: 195.4° C.). A polymer electrolyte membrane was obtained using the conducting copolymer.

Example 3

A conducting copolymer was prepared in the same manner as in Example 1, except that 6.506 g (28.50 mmol) of a compound represented by Formula 5, 4.026 g (18.45 mmol) of a compound represented by Formula 6, 5.194 g (12.30 mmol) of a compound represented by Formula 7, 0.438 g (1.5 mmol) of a compound represented by Formula 8, 4.30 g of hydrous $K_2CO_3$, 80 ml of DMSO, and 40 ml of toluene were used ($T_g$: 167.4° C., $T_d$: 184.0° C.). A polymer electrolyte membrane was then formed using the conducting copolymer.

Example 4

A conducting copolymer was prepared in the same manner as in Example 3, except that 0.243 g (1.5 mmol) of a compound represented by Formula 9 was used in place of the compound represented by Formula 8 ($T_g$: 164.5° C., $T_d$: 183.3° C.). A polymer electrolyte membrane was formed using the conducting copolymer.

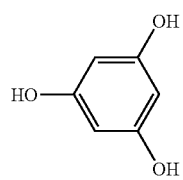

Formula 9

Comparative Example 1

A conducting copolymer was prepared in the same manner as in Example 1, except that 3.242 g (14.20 mmol) of a compound represented by Formula 5, 2.066 g (9.47 mmol) of a compound represented by Formula 6, 1.997 g (4.73 mmol) of a compound represented by Formula 7, 1.96 g of hydrous $K_2CO_3$, 36 ml of DMSO, and 20 ml of toluene were used ($T_g$: 136.4° C., $T_d$: 219.2° C.). A polymer electrolyte membrane was formed using the conducting copolymer.

Comparative Example 2

A solution of NAFION™ (manufactured by Dupont) was cast and dried in an oven at 60° C. for 24 hours to produce a polymer electrolyte membrane (membrane thickness: about 92 µm). The polymer electrolyte membrane was immersed in a 1.0M aqueous solution of hydrochloric acid for 24 hours to be protonated. Then, the polymer electrolyte membrane was immersed in distilled water for 24 hours to produce a polymer film.

The proton conductivity, methanol permeation, and water content of the obtained polymer films were measured at room temperature. The results are summarized in Table 1.

TABLE 1

| | Thickness (µm) | Proton conductivity (S/cm) | Methanol permeation (cm²/sec) | Water content (%) |
|---|---|---|---|---|
| Example 1 | 132 | $1.34 \times 10^{-3}$ | $3.50 \times 10^{-8}$ | 13.2 |
| Example 2 | 125 | $2.92 \times 10^{-4}$ | $1.23 \times 10^{-7}$ | 8.5 |
| Example 3 | 112 | $3.19 \times 10^{-3}$ | $6.25 \times 10^{-8}$ | 15.3 |
| Example 4 | 121 | $3.01 \times 10^{-3}$ | $7.98 \times 10^{-8}$ | 15.6 |
| Comparative Example 1 | 100 | $2.66 \times 10^{-3}$ | $8.08 \times 10^{-8}$ | 14.7 |
| Comparative Example 2 | 92 | $1.68 \times 10^{-3}$ | $1.58 \times 10^{-6}$ | 32 |

It is confirmed from Table 1 that the polymer electrolyte membranes prepared using the crosslinked copolymer in Examples 1-4 had remarkably lower methanol permeation than the polymer electrolyte membrane prepared using the conventional polymer NAFION™ in Comparative Example 2. Although the polymer electrolyte membrane prepared according to Example 2 had slightly lower ionic conductivity than the polymer electrolyte membrane prepared according to Comparative Example 2, that result is believed to be due to a difference in water content. It is believed that if the water content of the polymer electrolyte membrane obtained in Example 2 is allowed to increase, the ionic conductivity of the polymer electrolyte membrane obtained in Example 2 will be equal to that of the polymer electrolyte membrane obtained in Comparative Example 2.

Further, it was confirmed that the polymer electrolyte membranes prepared according to Examples 1-4 had slightly greater ionic conductivity and lower methanol permeation than the polymer electrolyte membrane prepared according to Comparative Example 1.

In order to examine the swelling properties of the polymer electrolyte membranes, each of the dried polymer electrolyte membranes was immersed in an aqueous solution of methanol at 25° C. for 12 hours and its volumetric increase was measured. Further, in order to examine the swelling properties under operating conditions, each of the dried polymer electrolyte membranes was immersed in water at 80° C. for 24 hours and its volumetric increase was measured. The results are summarized in Table 2. The term volumetric increase refers to the percentage increase in the volume of a polymer electrolyte membrane after its immersion in an aqueous solution of methanol solution or an aqueous solution of another liquid fuel, based on the volume of the polymer electrolyte membrane before the immersion.

TABLE 2

|  | 4.5 M Aqueous solution of methanol | 17 M Aqueous solution of methanol | Water |
|---|---|---|---|
| Example 1 | 17.1 | 23.3 | 14.5 |
| Example 2 | 12.8 | 20.4 | 9.8 |
| Example 3 | 17.4 | 26.8 | 18.6 |
| Example 4 | 17.7 | 27.5 | 19.1 |
| Comparative Example 1 | 17.7 | 38.5 | 17.2 |
| Comparative Example 2 | 45 | 88 | 40.5 |

It was confirmed from Table 2 that the polymer electrolyte membranes prepared according to Examples 1-4 had remarkably lower liquid content than the polymer electrolyte membrane prepared according to Comparative Example 2. Further, it was confirmed that the polymer electrolyte membranes prepared according to Examples 1-4 had slightly lower liquid content than the polymer electrolyte membrane prepared according to Comparative Example 1. In particular, as the concentration of methanol in the solution increases, the differences in liquid content between the polymer electrolyte membranes increase.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ion-conducting, sulfonated and crosslinked copolymer comprising:
   a first monomer comprising an aromatic diol;
   a second monomer comprising two groups, each group capable of reacting with hydroxy groups of the first monomer and each group independently selected from a nitro group and a halogen group;
   a third monomer comprising one of the first monomer or the second monomer wherein a hydrogen atom attached to a benzene ring is substituted with —SO$_3$Y, where Y is selected from hydrogen (H), lithium (Li), sodium (Na), potassium (K) or trialkyl ammonium of the form HNR$_3$ where R is an alkyl group having from 1 to 5 carbon atoms; and
   a fourth monomer comprising at least three groups independently selected from a hydroxy group, a nitro group, and a halogen group.

2. The ion-conducting, sulfonated and crosslinked copolymer of claim 1, wherein a mole ratio of the hydroxy groups to the total of the nitro groups and the halogen groups is from 4.0:6.0 to 6.0:4.0.

3. The ion-conducting, sulfonated and crosslinked copolymer of claim 1, wherein a mole ratio of the hydroxy groups to the total of the nitro groups and the halogen groups is from 4.8:5.2-5.2:4.8.

4. The ion-conducting, sulfonated and crosslinked copolymer of claim 1, wherein a mole fraction of the fourth monomer to the total of the first through fourth monomers having the same reactive functional group as the fourth monomer is from 0.001 to 0.5.

5. The ion-conducting, sulfonated and crosslinked copolymer of claim 1, wherein a mole fraction of the fourth monomer to the total of the first through fourth monomers having the same reactive functional group as the fourth monomer is from 0.03-0.25.

6. The ion-conducting, sulfonated and crosslinked copolymer of claim 1, wherein a mole fraction of the fourth monomer to the total of the first through fourth monomers having the same reactive functional group as the fourth monomer is from 0.05-0.15.

7. The ion-conducting, sulfonated and crosslinked copolymer of claim 1, wherein a mole fraction of the third monomer to the total of the first through fourth monomers is from 0.01 to 0.95.

8. The ion-conducting, sulfonated and crosslinked copolymer of claim 1, wherein the first monomer is at least one compound selected from the group consisting of the compounds represented by Formulae 1(a) through 1(w):

Formula 1

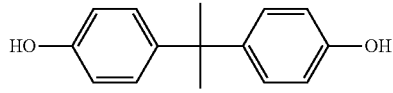

(a)

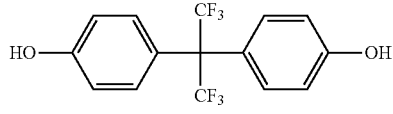

(b)

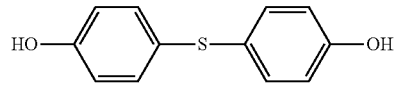

(c)

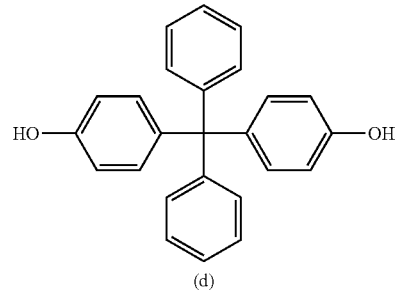

(d)

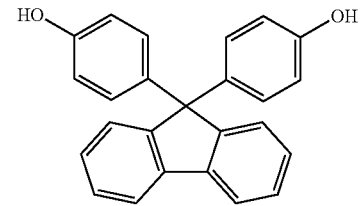

(e)

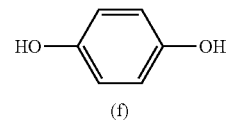

(f)

-continued
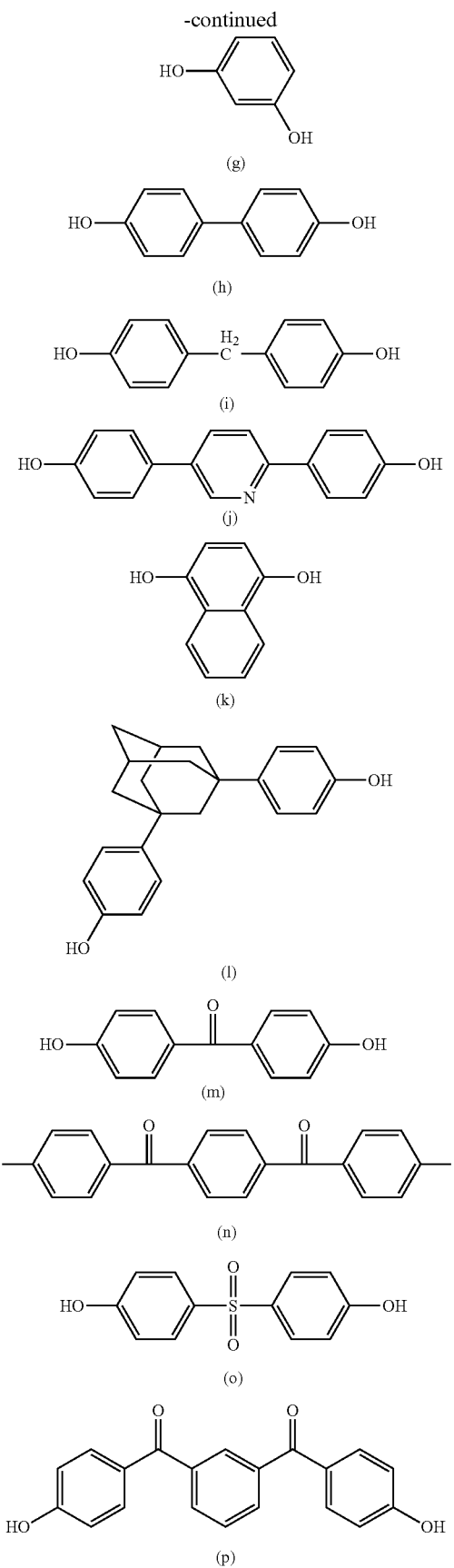
-continued
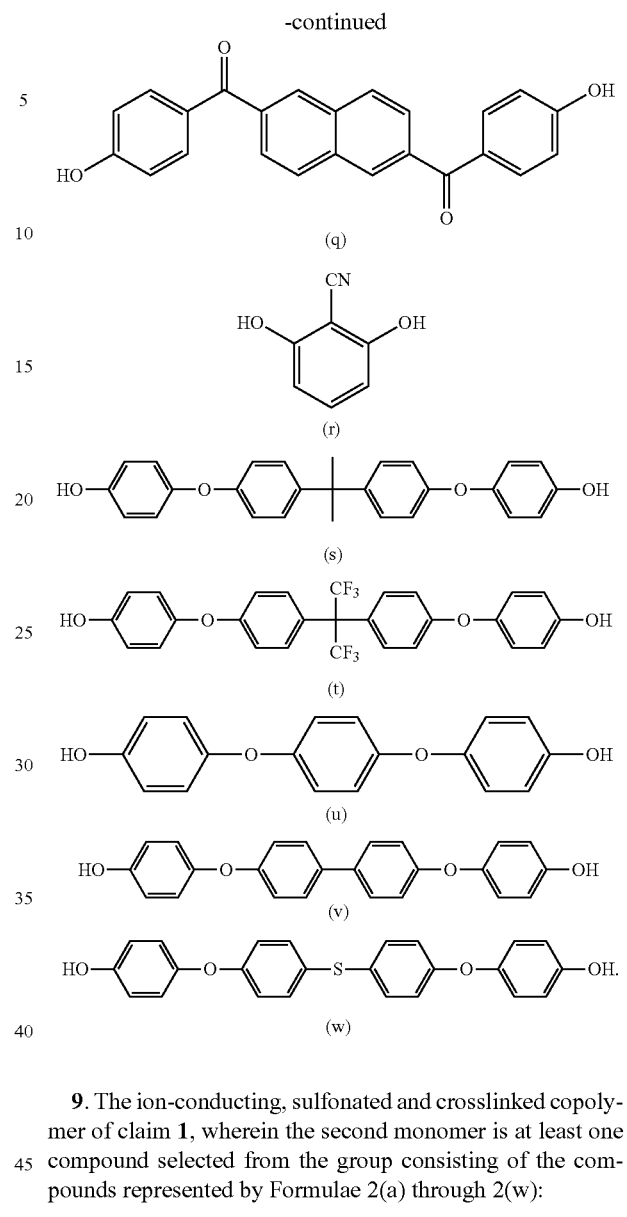
9. The ion-conducting, sulfonated and crosslinked copolymer of claim 1, wherein the second monomer is at least one compound selected from the group consisting of the compounds represented by Formulae 2(a) through 2(w):
Formula 2
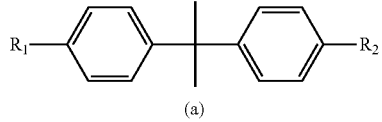
(a)
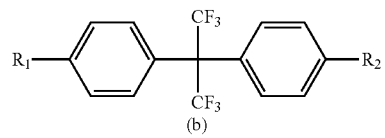
(b)
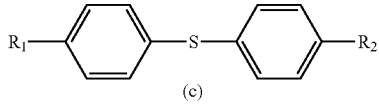
(c)

-continued
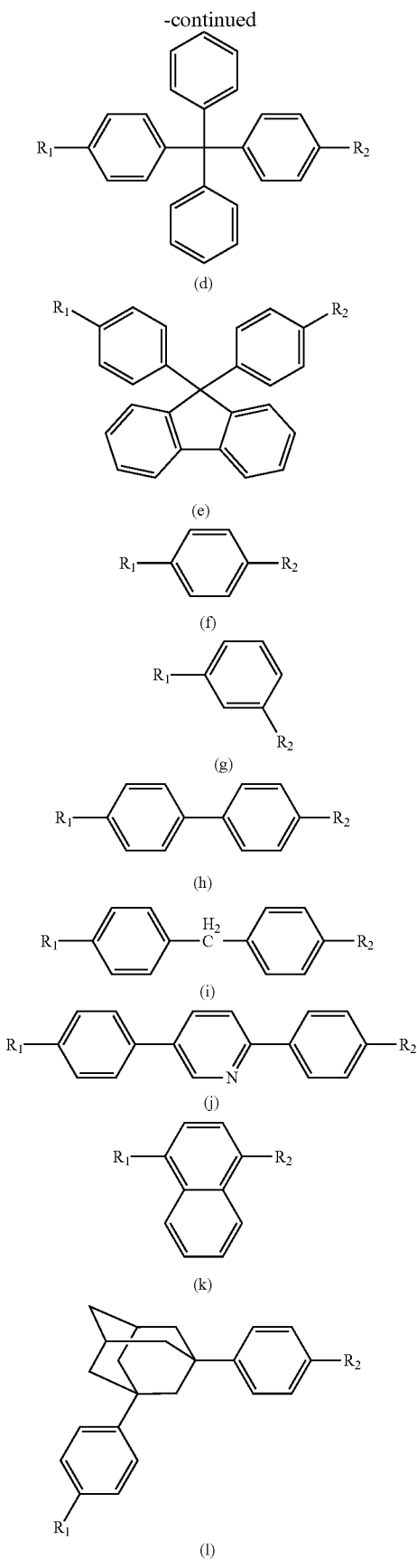
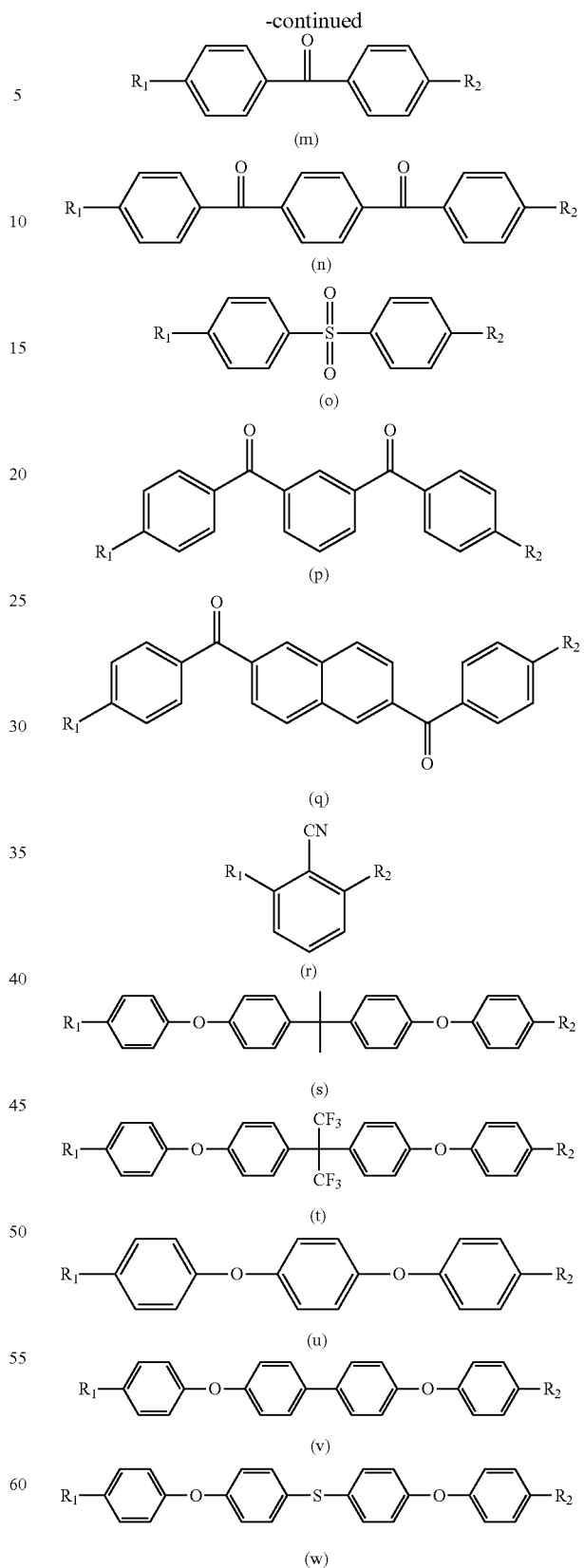
where each of $R_1$ and $R_2$ is independently selected from the group consisting of a nitro group and a halogen group.

10. The ion-conducting, sulfonated and crosslinked copolymer of claim 1, wherein the third monomer is at least one compound selected from the group consisting of the compounds represented by Formulae 3(a) through 3(d):

Formula 3

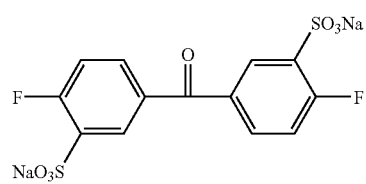

(a)

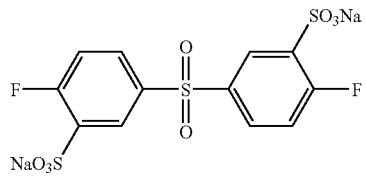

(b)

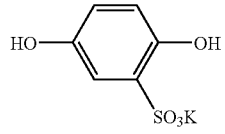

(c)

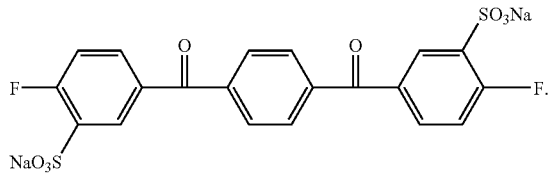

(d)

11. The ion-conducting, sulfonated and crosslinked copolymer of claim 1, wherein the fourth monomer is at least one compound selected from the group consisting of the compounds represented by Formulae 4(a) through 4(g):

Formula 4

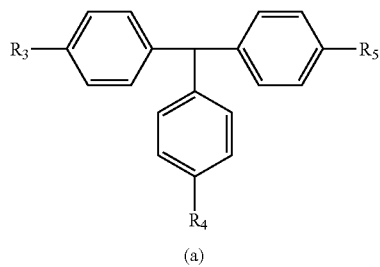

(a)

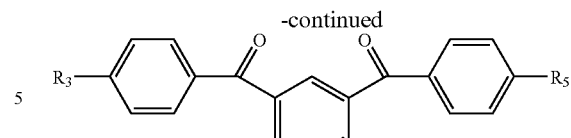

(b)

-continued

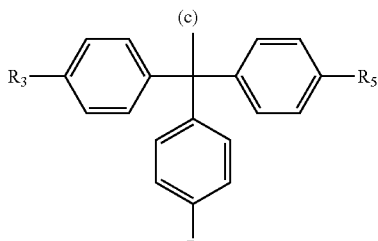

(c)

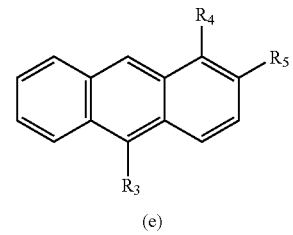

(d)

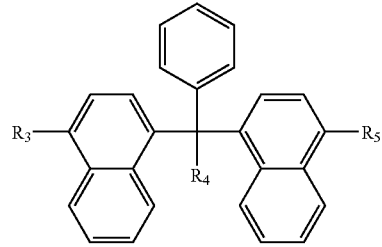

(e)

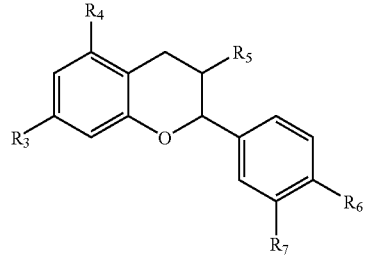

(f)

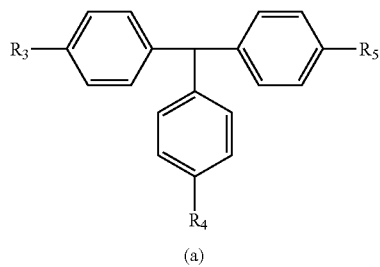

(g)

where each of $R_3$ through $R_7$ is independently selected from the group consisting of a hydroxy group, a nitro group and a halogen group.

12. A polymer electrolyte membrane comprising the ion-conducting, sulfonated and crosslinked copolymer of claim 1.

13. The polymer electrolyte membrane of claim 12, wherein a mole ratio of the hydroxy groups to the total of the nitro groups of the and the halogen groups of the ion-conducting, sulfonated and crosslinked copolymer is from 4.0:6.0 to 6.0:4.0.

14. The polymer electrolyte membrane of claim 12, wherein a mole fraction of the fourth monomer to the total of the first through fourth monomers having the same reactive functional group as the fourth monomer is from 0.001 to 0.5.

15. A membrane electrode assembly comprising:
the polymer electrolyte membrane of claim 12;
an anode on one side of the polymer electrolyte membrane comprising a catalytic layer and a diffusion layer; and
a cathode on the other side of the polymer electrolyte membrane comprising a catalytic layer and a diffusion layer.

16. The membrane electrode assembly of claim 15, wherein a mole ratio of the hydroxy groups to the total of the nitro groups of the and the halogen groups of the ion-conducting, sulfonated and crosslinked copolymer is from 4.0:6.0 to 6.0:4.0.

17. The membrane electrode assembly of claim 15, wherein a mole fraction of the fourth monomer to the total of the first through fourth monomers having the same reactive functional group as the fourth monomer of the ion-conducting, sulfonated and crosslinked copolymer is from 0.001 to 0.5.

18. A fuel cell system comprising:
a plurality of the membrane electrode assemblies of claim 15 arranged in a fuel cell stack;
a fuel supplier adapted to supply fuel to the fuel cell stack; and
an oxygen supplier adapted to supply an oxidant to the fuel cell stack.

19. The fuel cell system of claim 18, wherein a mole ratio of the hydroxy groups to the total of the nitro groups of the and the halogen groups of the ion-conducting, sulfonated and crosslinked copolymer is from 4.0:6.0 to 6.0:4.0.

20. The fuel cell system of claim 18, wherein a mole fraction of the fourth monomer to the total of the first through fourth monomers having the same reactive functional group as the fourth monomer of the ion-conducting, sulfonated and crosslinked copolymer is from 0.001 to 0.5.

* * * * *